Figure 6:
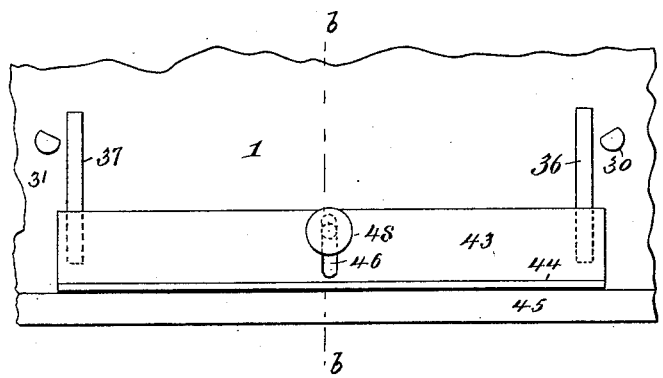

(No Model.)   5 Sheets—Sheet 1.
A. G. TISDELL.
PHOTOGRAPHIC CAMERA SHUTTER.
No. 520,972.   Patented June 5, 1894.
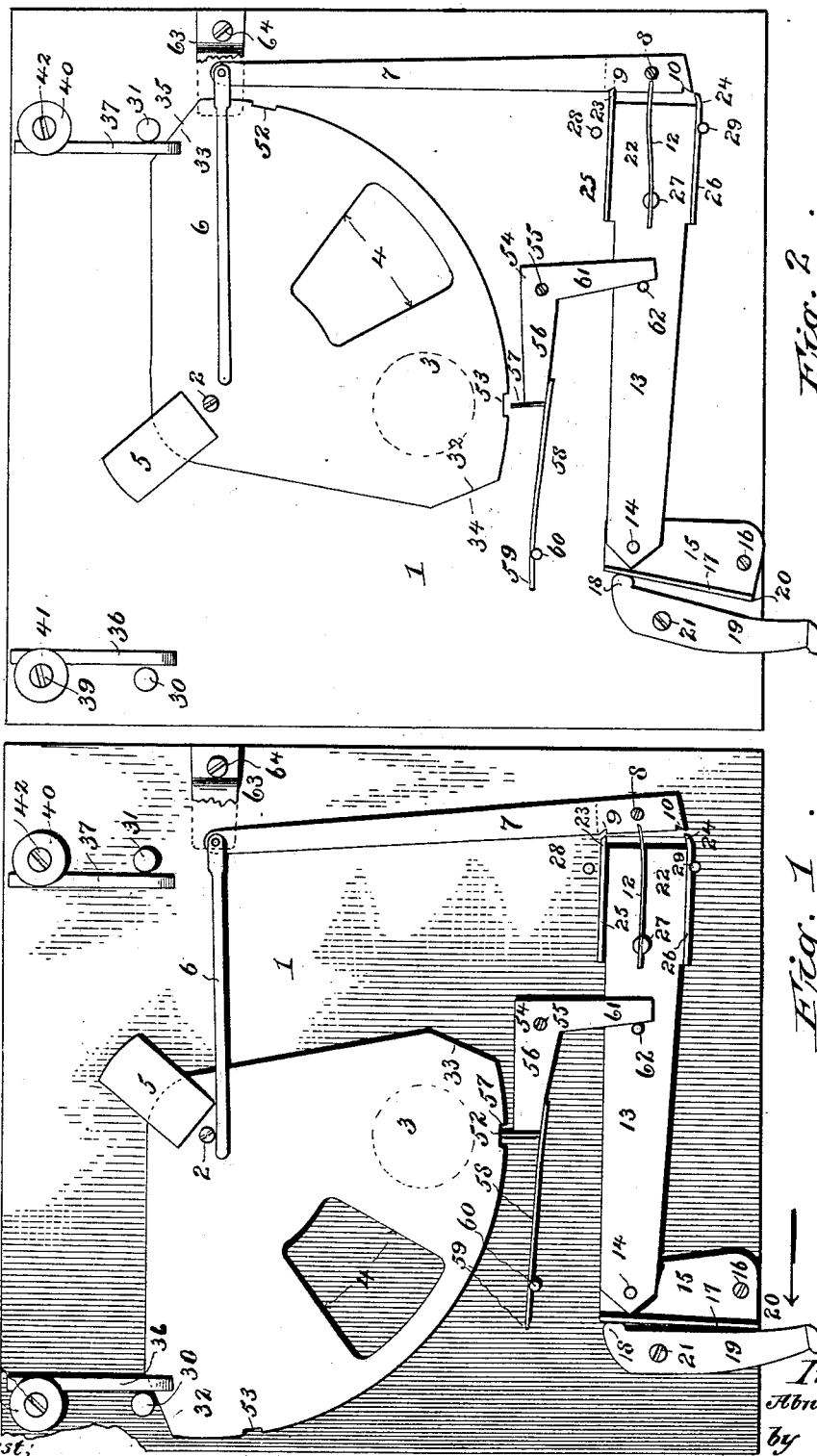

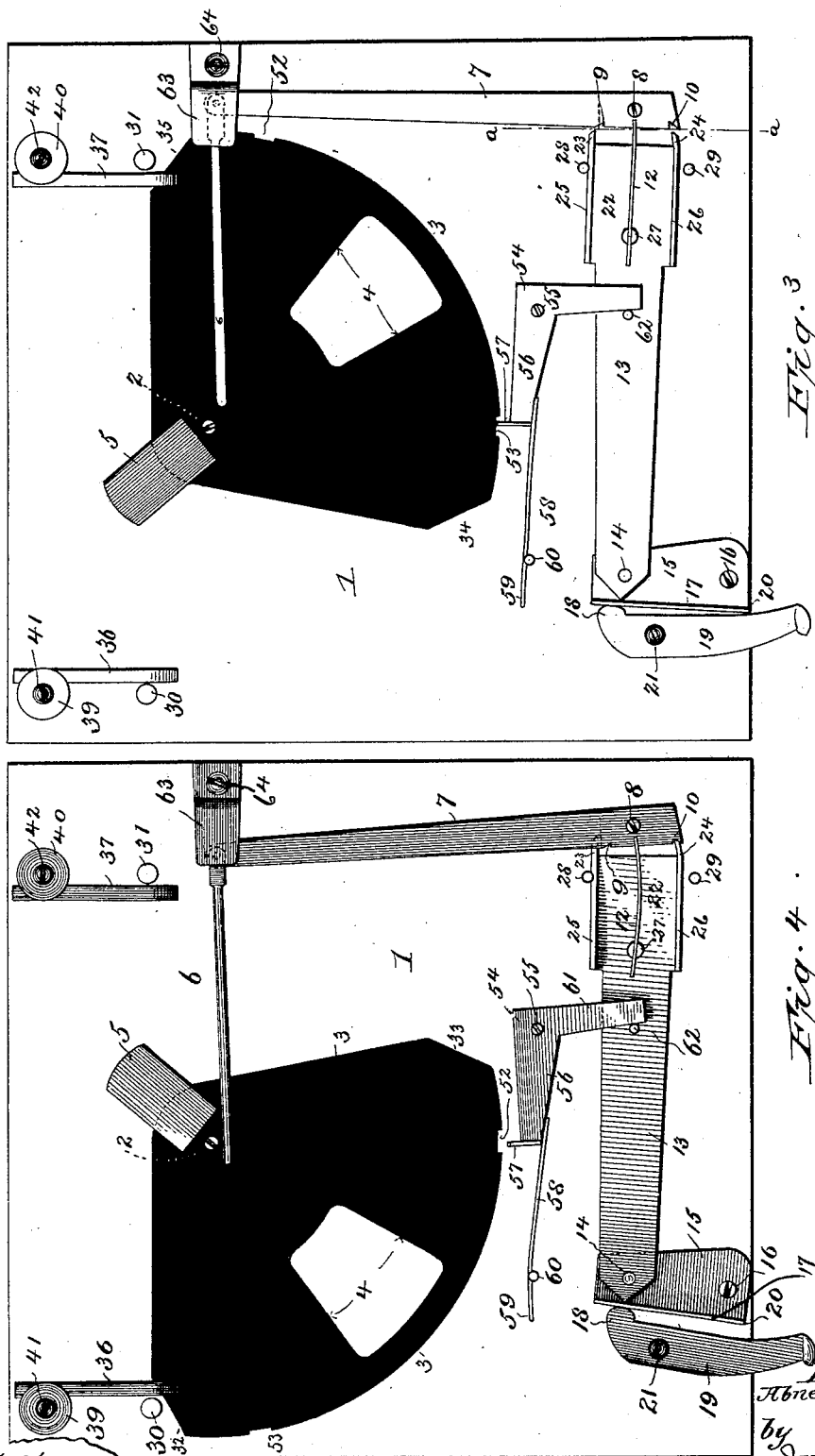
(No Model.) 5 Sheets—Sheet 2.
A. G. TISDELL.
PHOTOGRAPHIC CAMERA SHUTTER.
No. 520,972. Patented June 5, 1894.
Inventor,
Abner G. Tisdell.
by Joseph L. Levy
Atty (No Model.) 5 Sheets—Sheet 3.
A. G. TISDELL.
PHOTOGRAPHIC CAMERA SHUTTER.

No. 520,972. Patented June 5, 1894.

Attest,
C. W. Benjamin
H. F. Durbut

Inventor,
Abner G. Tisdell.
by Joseph L. Levy
atty.

THE NATIONAL LITHOGRAPHING COMPANY,
WASHINGTON, D. C.

(No Model.)  5 Sheets—Sheet 4.

A. G. TISDELL.
PHOTOGRAPHIC CAMERA SHUTTER.

No. 520,972. Patented June 5, 1894.

Witnesses:
C. W. Benjamin.
H. F. Durbur.

Inventor:
Abner G. Tisdell.
by Joseph L. Levy
Atty (No Model.) 5 Sheets—Sheet 5.
A. G. TISDELL.
PHOTOGRAPHIC CAMERA SHUTTER.
No. 520,972. Patented June 5, 1894.
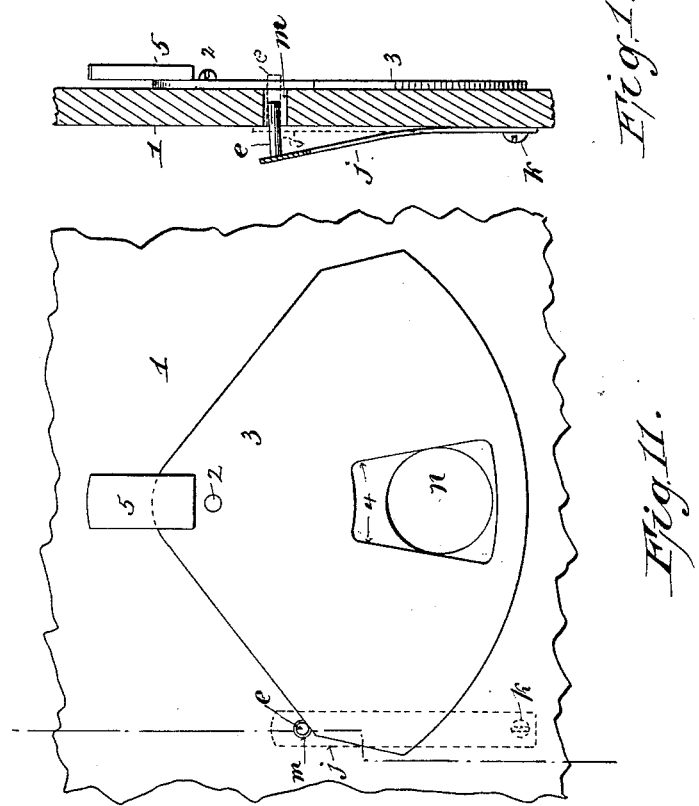
Witnesses:
C. W. Benjamin
H. F. Dunbar
Inventor:
Abner G. Tisdell.
by Joseph L. Levy
atty.

UNITED STATES PATENT OFFICE.

ABNER G. TISDELL, OF BROOKLYN, ASSIGNOR OF ONE-HALF TO JOSEPH L. LEVY, OF NEW YORK, N. Y.

PHOTOGRAPHIC-CAMERA SHUTTER.

SPECIFICATION forming part of Letters Patent No. 520,972, dated June 5, 1894.

Application filed October 11, 1892. Serial No. 448,500. (No model.)

*To all whom it may concern:*

Be it known that I, ABNER G. TISDELL, a citizen of the United States of America, residing at Brooklyn, county of Kings, State of New York, have invented certain new and useful Improvements in Photographic-Camera Shutters, of which the following is a specification.

My invention relates to shutters for photographic cameras and to that class used for instantaneous or very brief exposures, although it could be adapted for use in time exposures. Such shutters have been formed and constructed in various ways; but they may, generally speaking, be roughly classed as follows: Those in which the shutter moves across the front of the lens, exposing the plate by its movement always in one direction for the exposure, having to be set by the operator in the reverse direction when preparing to take a picture. Such shutters are driven by springs in the direction of the movement necessary for the exposure, and the operator compresses the spring when he sets the shutter before exposure. Of course, in this class of shutter, the setting of the shutter and the freeing thereof are two separate and distinct operations. Another class of shutter consists of a rotating device driven by a suitable coil spring, which always moves for exposure in the same direction, the operator winding the spring from time to time and freeing the shutter with a button or like device when the exposure is to be made. In this class of shutter, as in the previous one, placing the spring under tension to drive the shutter requires one operation, while the freeing of the shutter to make an exposure is a separate and distinct operation. Another class of shutter exists, invented by myself, wherein the motion to free the shutter first compresses a spring, and then when the proper compression is obtained the shutter passes across the lens, exposing the picture. In other words the act of compressing the spring and freeing the shutter is a single and continuous operation. To make another exposure, the button or operating lever is pushed in the opposite direction, and the shutter passes in the reverse direction across the lens; and the second exposure is thus made. In this case the shutter is driven by the compressed spring, and the button has to be moved in opposite directions at each exposure. This is disadvantageous, as the operator never knows in which direction to press the button, unless he remembers how he pressed it at the last exposure.

My present invention is clearly distinguishable from any of these previous devices; and it is distinguishable, first, from the fact that the shutter is not driven by spring action; second, from the fact that the shutter is adapted to make an exposure of the proper time at each vibration thereof across the face of the lens, while at the same time the button which is pressed by the operator's fingers is moved in the same direction always, regardless of which direction the shutter may be required to move for the purpose of exposure. Thus, all the operator has to do is to pull upon the button, and when he hears the shutter move remove his finger, the button assuming its primary position; and for the next exposure the operator repeats the previously described operation, always giving the button or lever the same direction of motion. Thus, in my present invention I have a shutter adapted for exposing the plate for a proper length of time despite the direction of movement of the shutter; and I have an operating button or lever which with every exposure is pressed in the same direction; and my shutter is not driven by any compressed spring, or the like, but by the action of the mechanism now being described.

I may here state, before describing the drawings, that the speed of operation of my shutter is variable, and may be adjusted by regulating the pressure upon the shutter of two springs, which also act to take up the momentum of the shutter after it passes the lens opening and which bring it to a state of rest.

Figure 7:
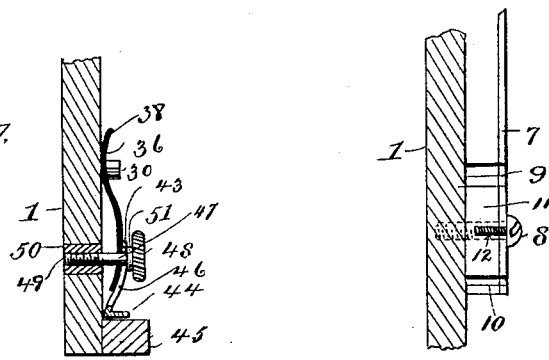
Figure 5:
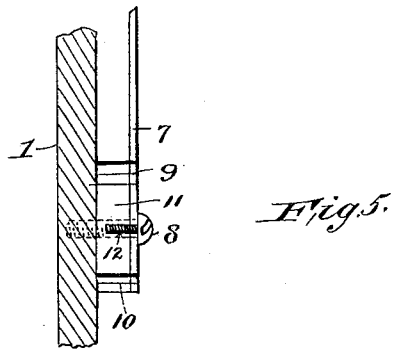
Figure 10:
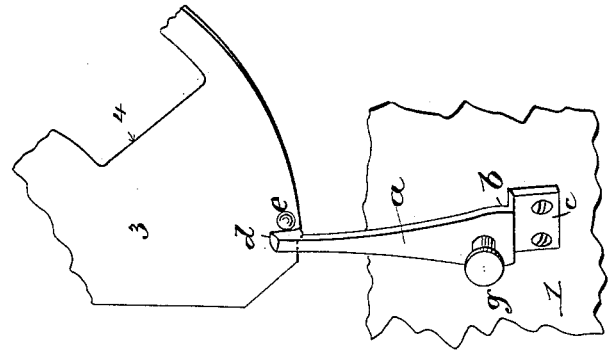
Figure 9:
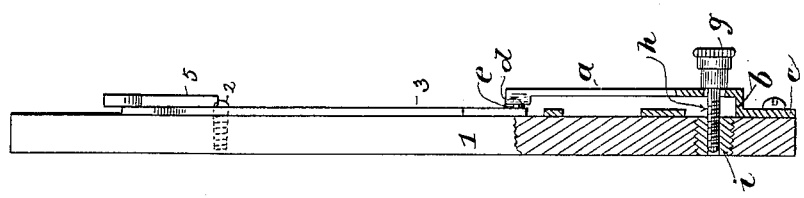
Figure 8:
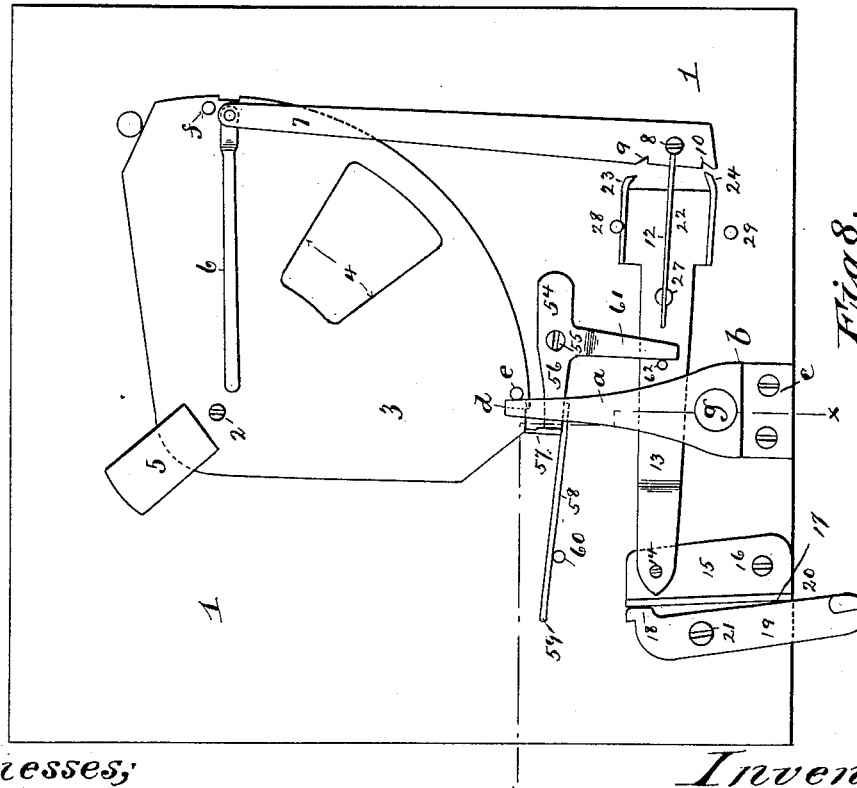

In the drawings Figure 1 shows my shutter in one of its two normal positions. Fig. 2 shows the shutter after it has been moved from the position shown in Fig. 1 to the position shown in Fig. 3, and before the operator has removed his finger from the operating button or lever. Fig. 3 shows the shutter in its second normal position. Fig. 4 shows the shutter returned to the original position shown in Fig. 1 but with the operator still exerting pressure on the lever as in Fig. 2. Fig. 5 is an enlarged fragmentary view, partly in section taken on the line $a, a$, Fig. 3. Fig. 6 is a front elevation of a modified form of device for regulating the speed of movement of the shutter. Fig. 7, is a vertical section of the same taken approximately on the line $b, b$, Fig. 6; Fig. 8, a front elevation of the shutter showing the preferred form of device for regulating the speed of movement of the shutter; Fig. 9, a side elevation of Fig. 8, partly in section, on the line $x—x$; Fig. 10, an enlarged perspective of the shutter speed regulating device; Fig. 11, a front elevation of a shutter, showing the time exposing device attached thereto; Fig. 12, a side elevation, partly in section, on the line $y—y$, of Fig. 11.

Similar numerals and letters of reference refer to like parts throughout the several views.

In the various drawings the shutter board is indicated by the part marked 1 and has pivoted thereto at 2 the shutter 3 with its opening 4 adapted to pass in front of an ordinary photographic lens and expose the same, the shutter board being apertured for this purpose. The shutter is provided with a counterweight 5 to balance it while in motion. A link 6 connects the shutter with the propelling lever 7 which lever is pivoted at 8. This lever is provided with a block portion 11, Fig. 5, which may, for convenience of manufacture, be made separate from the extended portion of the lever, and afterward secured thereto, and I have so shown it. The lever 7 is pivoted on the board 1 by the pin 8, and the block portion 11 is contiguous to said board. This portion of the lever is also provided with two notches 8 and 9. A small spring 12 is rigidly fastened to the lever 7 and projects therefrom at approximately right angles. A device which I term the shifting connector 13 is pivoted at 14 to the rocker 15, and the rocker is pivoted to the shutter board at 16. The rocker 15 has a flange 17, against which the lug 18 on the finger lever 19 bears at all times, the corner 20 of the rocker acting as a stop to prevent the lug 18 moving out of contact with the rocker. The finger lever is pivoted to the shutter board at 21.

The end 22 of the shifting connector 13, where it co-operates with the lever 7, is arranged as follows: Two dogs 23, 24 are formed thereon, and these dogs are continued for a short distance back on the end 22 of the connector 13 and form abutments 25, 26, the dogs being adapted to enter the notches 9, 10 in the lever 7, the dogs being farther apart than are the notches. A pin 27, having a slotted head, is rigidly fastened to the connector 13, and in the slot of this pin the end of the spring 12 projecting from the lever 7 is received, and is free to slide therein. Two pins or stops 28, 29 are fixed in the shutter board, and these pins admit of a certain amount of movement of the connector 13 between them, and limit and direct said movement, and determine the relative positions of the registering contact portions of the connector 13 and lever 7, that is to say, the projections 25, 26, from the bar 13, and the notches 9, 10 in the lever 7. Upon the relative position of these contact portions depends the direction of movement of the shutter resulting from the next pressure by the finger on the finger lever, as will now be described.

Upon comparing Figs. 1 and 2, it will be seen how the direction of the lever 7 depends upon the position of the shutter, to which it is connected by the link 6. When the shutter is on the left hand side of its pivot, as in Fig. 1, the lever 7 inclines to the left more than in the other position in Fig. 2. Now the spring 12 is rigidly secured to the lever 7 so as to project at right angles therefrom. Therefore the direction of the part of the spring which projects from the lever also varies with the position of the shutter, being more downward in Fig. 1 than in Fig. 2. Now the tendency of the spring is to straighten itself. Hence the outer or loose extremity of the spring tends always to assume the same direction as the inner or fixed extremity, that is, it carries the pin 27 and the connector 13 downward when the part of the spring adjacent to the lever 7 points downward, and conversely. I thus obtain means for producing motion of the connector 13 transversely of its length. I am thus enabled to shift the connector, up or down as the case may be, past the slots 9, 10. But the pins 28, 29, already referred to, are so placed that when the connector 13 is stopped in its downward motion by contact of the pin 29 with the abutment 26 the projection 23 is exactly opposite the slot 9, and when it is stopped in its upward movement by contact of the pin 28 with the abutment 25 the projection 24 is exactly opposite the slot 10. Thus, following the operation of this portion of my invention through the positions shown in Figs. 1, 2, 3 and 4, we see that in Fig. 1, the shutter is to the left, the lever 7 inclines to the left, and the spring 12, projecting slightly downward from the lever, exerts a downward pressure upon the connector 13 through the pin 27, pressing it against the limiting stop 29, and it is seen that the projection 23 is now opposite to the slot 9. The operator having pulled the finger lever, the shutter is now thrown into the position shown in Fig. 2. Here the spring 12 no longer has a downward tendency but points higher than it did before, owing to the change of direction of the lever 7. The spring thus tends to raise the connector 13, but cannot do so because of the engagement of the projection 23 in the slot 9. As soon, however, as the pressure is removed from the finger lever, the connector is automatically retracted, as will be presently described, and the connector is free to obey the upward pressure of the spring 12 until stopped by the upper pin 28, when the lower projection 24 is opposite to the slot 10 as shown in Fig. 3, so as to engage the slot when pressure is again exerted on the finger lever, as shown in Fig. 4. When pressure is withdrawn from the finger lever, the parts will again assume the position shown in Fig. 4, and the operation may be repeated indefinitely.

The devices for absorbing the impact of the shutter, detaining it against the pressure of the operating devices, and stops for arresting the movement of the shutter will now be described. These devices include means for regulating the speed of movement of the shutter to give longer or shorter exposures.

Two pins 30, 31 are secured to the shutter board at points thereon which arrest the movement of the shutter so as to bring one of its unapertured side portions 32, 33 (Figs. 1 and 2) in front of the lens opening. The pins or stops may be round pegs as shown in Figs. 1 to 4, or with flat stop faces as shown in Fig. 6. The wings of the shutter are suitably configured as at 34, 35 so as to give a good impact surface.

There are three devices shown herein for regulating the speed of exposure of the shutter, but that shown in Figs. 8, 9, and 10 I prefer, except that the stops 30, 31, and the springs 36, 37 (forming part of one of the two other of the three devices for this purpose) can be retained in addition to the device shown in Figs. 8, 9, and 10, to arrest and absorb the impact and momentum of the shutter, and not as device for regulating its speed.

The device shown in Figs. 8, 9, and 10 comprises the spring detent $a$ having the bend $b$ and extension $c$, the extension $c$ being secured to the shutter board by screws or otherwise, the bend $b$ causing the detent to stand away from the shutter board. The upper portion of the detent is provided with a wedge shaped lug $d$, which is located adjacent to the line of travel of two studs $e$, $f$, set at opposite corners of the shutter 3. These studs are preferably rounded so as to permit them to pass smoothly under the lug $d$. When the parts are in the position shown in Fig. 8, the stud $e$ rests against the side of the lug $d$, and the movement of the shutter to the left is restrained by the contact, until the pressure on the shutter lifts the lug $d$ against the stress of the detent $a$, causing the same to be forced back, the stud $e$ passing under the lug $d$ and permitting the shutter to continue in the direction given to it by its propelling parts. It is thus clear that the greater the stress of the detent $a$, the faster the shutter will move, as the force necessary to overcome the stress of the detent is in proportion; and the converse for a slower movement of the shutter is true. To alter the stress of the detent, I employ the thumb screw $g$, its screw threaded extension $h$ entering a screw threaded block $i$ set in the shutter board. The shoulder of the head of the screw $g$ abuts against the detent $a$, which is kept in contact therewith by reason of its resiliency, and as the head of the screw $g$ is moved to or from the shutter board, so will the stress of the detent be smaller or greater, imparting a swifter or slower movement to the operated shutter.

A modified form of device, as follows may be used: Two springs 36, 37, having upturned ends 38, Figs. 1 to 4, are held down on the shutter board by means of the washers 39, 40, and set screws 41, 42. In its movement the wings of the shutter pass under the springs and strike the stops which limit and arrest its movement, while the springs prevent its rebounding by detaining it, and the amount of pressure exerted on the shutter by the springs determines by their resistance the speed of movement of the shutter. This degree of pressure can be changed and the shutter given a faster or slower movement by changing the length of the springs, which can be accomplished by moving them back and forth under the washers and securing them thereunder by the set screw in the desired position. In Figs. 1 to 4 an independent adjustment of each of the springs can be had, so that the shutter can be given a different speed for either direction of the device for regulating the speed of movement of the shutter. However under ordinary circumstances and especially when my shutter is used on cameras of a cheaper class, and when this form is employed, I prefer to use means for adjusting the tension of both of the detaining springs at the same time, and by one device. A device embodying this feature is shown in Figs. 6 and 7, in which 43 is a spring carrying bar to which the springs 36, 37 are secured. This bar is provided at its lower edge with a flange 44, which rests on a small extension 45 of the shutter board 1. The bar 43 is provided with an aperture 46 through which extends the shank 47 of the thumb screw 48 which has a screw threaded extension 49 adapted to work in a screw threaded bed 50 set in the shutter board 1 in any desired manner. The shank 47 carries a washer 51 which is located between the bar 43 and thumb screw 48 and bears against both. This washer may be dispensed with and its equivalent formed on the enlarged head of the thumb screw 48. By turning the thumb screw in either direction the bar 43 with the springs 36, 37 will be moved to or from the shutter board and any degree of tension given to the springs, the upper ends 38 of which normally bear against the shutter board, the flange 44 acting as a stop to limit the outward movement of the bar 43 to prevent the springs being removed so far away that they will exert no pressure on the shutter and not act as detainers therefor.

It is desirable, but not absolutely essential, that means be provided to prevent the shutter being jarred from the position it occupies while covering the lens opening to one where the opening in the shutter aligns with a portion of such lens opening, when it will accidentally expose the plate, or enable such to take place. The means I have devised for accomplishing this are in a measure combined with the means for returning the connector 13, rocker 15 and lever 19 to a position of rest, but they may be made separate and distinct elements. The shutter is provided with two notches 52, 53 in its periphery. A bell crank lever 54 is pivoted to the shutter board at 55, one arm 56 of which is provided with a dog 57 which is adapted to be moved into either of the notches by a small spring 58 which is secured to the shutter board 1 at 59, rests upon a pin 60, and bears under the arm 56 of the lever 54, normally holding the dog 51 within the notches. The lower arm 61 bears at all times against a pin 62 on the connector 13, and the spring 58 besides moving the dog 57 into the notches, moves, by means of the bell crank lever 54, the connector 13, rocker 15, and lever 19 into the position of rest shown in Figs. 1 and 3. When the connector 13 is projected forward to move the dog 23, or 24 into the notch 9, or 10 the pin 62 moves the dog 57 out of the notch 52, or 53, enabling the shutter to vibrate and this withdrawal is accomplished before the shutter is moved, and re-entry thereof is only had after the shutter has come to rest. It is very plain that the spring for moving the connector 13, &c., could be a distinct device and not associated with the means for moving the dog 57.

During the operation of throwing the shutter, the lever 7 and link 6 at the point where they are united have a tendency to move outward away from the shutter. To prevent this I secure a guard 63 to the shutter board by the screw 64. The pin which unites the link 6 and lever 7 can bear against the guard and prevent this. Although this is not absolutely essential, I have found it useful.

The operation of the parts is as follows: The shutter being in the position shown in Fig. 1, the operator places his hand upon the finger lever 19 which he presses in the direction of the arrow. This forces the dog 23 into the notch 9 of the lever 7, and by continuing the pressure the operator moves the connector 13 forward, vibrating the lever 7, and by means of the link 6 succeeds at last in freeing from the pressure of the spring 36 the shutter which shoots across the lens, and before the operator removes his finger from the lever 19 the parts are in the position shown in Fig. 2, and the other edge of the shutter is caught under the opposite impact absorbing and detaining spring, which also assists in receiving and absorbing the impact of the shutter and brings it to rest. The operator now removes his finger from the lever 19, and when he does so the spring 58 operating through the bell crank lever 54 moves the dog 57 into the notch 53, and the connector 13, &c., and the parts come to rest in the positions shown in Fig. 3. It will now be seen that the connector is pressing against the upper pin 28, and that if the operator presses the button he will bring the dog 24 into co-operative relationship with the lower notch 10 of the lever 7, and the said lever, when the pressure is continued will then act as a lever of a different order, and the shutter will be forced in the reverse direction, although the direction of the movement of the operator's finger and the finger lever 19 is the same. This change in position, at each shutter movement, of the lever is effected by the spring 12 and the slotted pin 27. The spring 12 stands approximately at right angles from the lever 7, and as this lever, when the shutter is at rest, stands at either one of two angles, it is clear that the spring will, so far as the mechanism will permit, persist in its right angular relationship to the lever 7, and will assume one of its two angular positions. Thus when the shutter is in the position shown in Fig. 1, the spring 12 is holding the connector 13 down against the lower pin 29; then after the movement of the shutter, and when the position shown in Fig. 2 is reached, the angular position of the spring 12 will be changed; and when the operator's finger is removed from the lever 19 the spring will force the connector upward and against the upper pin 28, bringing the lower dog 29 of the connector 13 into the proper position for entering the lower notch 10 of the lever 7. Thus, at each operation of the shutter, the lever 7 changes from a lever of the first order, as in Fig. 4, to a lever of the third order, as in Fig. 2. Thus, as the drawings show the parts in Fig. 1, the lever 7, when the operator presses the lever 19, will operate as a lever of the third order; that is, with the power applied between the fulcrum and the weight; while in the next operation, to wit, that shown when the operator presses the lever 19, when the parts are in position of Fig. 3, the lever changes and becomes a lever of the first order, the power being applied at one end of the lever, while the weight at the opposite end and the fulcrum is between.

I believe myself to be broadly the first inventor of a camera shutter adapted for exposing the lens for the proper period during either motion of the shutter, said shutter being pulled or pushed, as the case may be, across the lens by means of a lever and a suitable connection, which lever changes at each operation from a lever of one order to a lever of another order. I also consider myself to be broadly the first inventor of a photographic shutter adapted to be moved to expose the plate in either direction, and having a primary operating device, such as the lever 19, which always moves in one direction, when operating the shutter this combination being broadly new with me.

It will be seen, and it is an essential feature of my invention, that the lever 7 should have the power applied to it to move the shutter near the fulcrum; while the shutter is moved by that end of the lever which sweeps through a large arc. By this construction the finger motion of the operator is small, and the movement of the shutter can be as great as desired. Also by this arrangement the detent $a$ or springs 36, 37, although they press upon the shutter with comparatively a small pressure, resist the pressure of the operator's finger to move the shutter to a much larger extent than they would were this arrangement of leverage not adopted, and whereby the pressure of the operator's finger is accumulated on the face of the lever 19 until sufficient power is applied to start the shutter, when the shutter is moved rapidly by the accumulated pressure that the operator's finger has acquired; and in this way the shutter can be quickly operated and made to spring through a considerable arc, although the operator's finger moves through a very small arc; and the operator's finger is allowed to accumulate the pressure by reason of the fact that he is operating against the long lever and by a movement of the finger lever in the small arc.

The arc of movement of the finger lever, as I have above referred to it, commences only after one of the dogs of the connector 13 has come into co-operative relationship with one of the notches of the lever 7, the prior movement of the finger lever being necessary to take up the slack which must exist between the end of the connector 13 and the end of the lever 7.

A device such as shown in Figs. 11 and 12 for permitting the shutter to be held for time exposures could be used. I, however, prefer that shown in Figs. 11 and 12 which is very simple and inexpensive. It consists in a spring bar $j$ secured at its lower end to the shutter board 1 as at $k$, which is provided at its upper end with an outwardly extending pin $e$. The board 1 is provided with an opening $m$, and into this opening the pin $e$ projects, which opening is so located, that when the edge of the shutter 3 is adjacent thereto the exposing orifice 4 therein will be over the lens opening $n$ in the shutter board or equivalent. If, prior to the movement of the shutter, the pin $e$ is projected through the opening $m$ (as shown in dotted lines, Fig. 12) it will bar the further movement of the shutter, and hold its exposing orifice 4 over the lens opening $n$, and when pressure on the spring bar $j$ is removed, the pin $e$ will be withdrawn, which will permit the shutter to traverse its complete path, shutting off the light and completing the exposure, the shutter then being under tension, as before set forth. The preferred method of use, however, would be to cause the shutter to strike the pin $e$ by a movement of the shutter in one direction, removing the tension of the shutter by removal of the finger pressure on the finger lever 19, the shutter then being in the exposing position, and after the desired time has elapsed, moving the shutter in the reverse direction, in the manner heretofore set forth. The movements of the shutter in this way will be positive.

Many changes in form can be made, and other adaptations used, without departing from the spirit of my invention.

I claim—

1. The combination of a photographic shutter adapted to be reciprocated past a lens opening, a reciprocating finger piece imparting motion to the shutter, and devices for transmitting said motion from said finger piece to said shutter, the finger piece moving always in the same direction when imparting said motion to said shutter in either direction of the latter, substantially as described.

2. The combination of a photographic shutter adapted to be moved past a lens opening, a lever connected to said shutter to rock the same, and a reciprocating propelling bar or connector 13, said connector being provided with projections 23, 24, arranged respectively above and below the lever pivot, said projections contacting with said lever alternately above and below its pivot as the connector is propelled toward the lever, substantially as described.

3. The combination of a shutter, a lever connected to said shutter to rock the same, a reciprocating propelling bar or connector adapted to be propelled into contact with said lever, means for withdrawing said bar from contact with said lever, and a guide spring, as 12, for guiding said bar laterally relatively to said lever, said guide spring engaging said bar and said lever, and having sliding connection with one of them, substantially as described.

4. The combination of a camera shutter, a lever connected thereto to rock the same, a reciprocating propelling bar or connector for actuating said lever, contacting with said lever first on one side of its pivot and then on the other, and a spring engaging said lever and bar for laterally vibrating the bar, substantially as described.

5. The combination of a shutter, a shifting connector or bar, a propelling lever and a link from the lever to the shutter, and connecting devices between the bar and propelling lever, the point of connection of said devices to the propelling lever being nearer to the fulcrum than the juncture of said propelling lever with said link, substantially as described.

6. The combination of a camera shutter, a lever having one end connected with the shutter to move the same, and a longitudinally moving bar contacting with said lever first on one side of its pivot and then on the other to actuate the lever, and means for transversely moving said bar into its alternate contacting positions, substantially as described.

7. The combination of a camera shutter, a lever actuating the same, a bar moving to and from the lever, and actuating it, and means for transmitting to said bar a transverse vibratory movement from the vibration of the lever, substantially as described.

8. The combination of a camera shutter, a lever operating the same, and a bar moving to and from the lever to actuate the same, said lever and bar being provided one with a pair of projections and the other with a pair of recesses opposite to the projections, forming two pairs of projections and recesses registering with each other, and arranged so that the members of each pair alternately engage each other, substantially as described.

9. The combination of a camera shutter, a lever operatively connected to the same, a bar loosely contacting with said lever for actuating the same having a longitudinal and also a transverse vibratory movement, and stops for limiting the latter movement, substantially as described.

10. The combination of a camera shutter, a lever operatively connected therewith, a spring extending at right angles therefrom, a bar having a sliding engagement with said spring and actuating the lever, said spring transmitting the vibratory movement of the lever to the bar, substantially as described.

11. The combination of a camera shutter, a lever operatively connected therewith, a longitudinally moving bar for operating the shutter, said lever and bar being provided with two pairs of registering contact portions, one pair on either side of the lever pivot, either of said pairs being thrown out of engagement at the engagement of the other pair, substantially as described.

12. The combination of a camera shutter, a lever operatively connected therewith, a bar, means for moving the same toward said lever, said bar being adapted to contact with said lever alternately above and below its pivot, and automatic means for alternating the position of contact, substantially as described.

13. The combination of the camera shutter, bar 13 for operating the shutter, and operative connection therefrom to the shutter, rocker 15 to which said bar is pivoted, and finger lever 19 operating said connector through the medium of the rocker, substantially as described.

14. The combination of the camera shutter, bar 13 for operating the shutter, and operative connection therefrom to the shutter, rocker 15 to which said bar is pivoted, and finger lever 19 operating said connector through the medium of the rocker, the rocker 15 having a stop 20 for said lever, substantially as described.

15. The combination of a camera shutter provided with notches, a dog having a vibratory motion and arranged to engage either of said notches, a train of operative mechanism for operating the shutter, a bar forming an element of said train, and a spring which simultaneously actuates said dog, and withdraws the bar from its operative connection, substantially as described.

16. The combination of a camera shutter provided with peripheral notches, a dog arranged to engage said notches, a bar and means for transmitting the motion of said bar to said shutter, and means whereby the motion of said bar withdraws the dog before said transmission, substantially as described.

17. The combination of a camera shutter provided with peripheral notches, a bar and means for transmitting the motion of said bar to said shutter, and a bell crank lever whereof one arm carries a dog adapted to engage either of said notches, and the other arm contacts with said bar, substantially as described.

18. The combination of a camera shutter, a bell crank lever, a detaining dog adapted to retain said shutter, carried by one arm of said lever, a reciprocating bar forming an element in the train of operating mechanism for said shutter, engaging the other arm of the lever, and thereby in its forward or propelling movement, withdrawing said dog from the shutter, substantially as described.

19. The combination of a camera shutter, propelling mechanism therefor, and a spring retaining device, pressing against the shutter, the direction of pressure being normal to the direction of movement of the shutter, and means for regulating said pressure, substantially as described.

20. The combination of a camera shutter, propelling mechanism therefor, and two retaining devices, whereof one is operated direct from the propelling device, and the other through the medium of the shutter, substantially as described.

21. The combination of a camera shutter, an operative train of propelling mechanism therefor, said train being discontinuous when not in operation, and two retaining devices whereof one is disengaged from the shutter before the completion of continuity of the train and the other after said completion, substantially as described.

22. The combination of a camera shutter, a propelling device therefor, and a spring retaining catch overlapping said shutter, which is provided with projections adapted to pass under and engage said catch, substantially as described.

Signed in the city, county, and State of New York this 8th day of October, 1892.

ABNER G. TISDELL.

Witnesses:
JOSEPH L. LEVY,
B. S. WISE.